US012605809B2

(12) United States Patent
Jiang et al.

(10) Patent No.: US 12,605,809 B2
(45) Date of Patent: Apr. 21, 2026

(54) HIGH-INTENSITY MAGNETIC TOOL EXTENSION ROD

(71) Applicants: Danyang Jianlu Tools Co., Ltd., Jiangsu (CN); Xiaofeng Zhang, Jiangsu (CN)

(72) Inventors: Ning Jiang, Jiangsu (CN); Xiaofeng Zhang, Jiangsu (CN)

(73) Assignees: Danyang Jianlu Tools Co., Ltd., Jiangsu (CN); Xiaofeng Zhang, Jiangsu (CN)

( * ) Notice: Subject to any disclaimer, the term of this patent is extended or adjusted under 35 U.S.C. 154(b) by 364 days.

(21) Appl. No.: 18/267,771

(22) PCT Filed: Mar. 27, 2023

(86) PCT No.: PCT/CN2023/083947
§ 371 (c)(1),
(2) Date: Jun. 15, 2023

(87) PCT Pub. No.: WO2024/168991
PCT Pub. Date: Aug. 22, 2024

(65) Prior Publication Data

US 2025/0091182 A1 Mar. 20, 2025

(30) Foreign Application Priority Data

Feb. 17, 2023 (CN) ........................ 202310128979.X

(51) Int. Cl.
*B25B 23/00* (2006.01)

(52) U.S. Cl.
CPC ...... *B25B 23/0021* (2013.01); *B25B 23/0035* (2013.01)

(58) Field of Classification Search
CPC .. B25B 23/12; B25B 23/0021; B25B 23/0035
See application file for complete search history.

(56) References Cited

U.S. PATENT DOCUMENTS 2,671,484 A * 3/1954 Clark ...................... B25B 23/12 81/125
3,253,626 A * 5/1966 Stillwagon, Jr. ........ B25B 23/12 81/177.85

(Continued)

FOREIGN PATENT DOCUMENTS

CN 215037004 U * 12/2021 ............. B25B 15/04

*Primary Examiner* — David B. Thomas
(74) *Attorney, Agent, or Firm* — CM Law LLP; Robert C. Klinger

(57) ABSTRACT

Disclosed is a high-intensity magnetic tool extension rod. The high-intensity magnetic tool extension rod comprises an extension rod, magnets and magnetic conduction structures. The magnets are symmetrically distributed on a lateral part of the extension rod with an axis center of the extension rod as a center. The magnetic conduction structures are arranged on an axial side of the magnet. The magnetic conduction structures comprise a front magnetic conduction structure and a rear magnetic conduction structure which are respectively arranged on both sides of the magnet. The front magnetic conduction structure is arranged at an adapted tool head connecting end of the extension rod, and the rear magnetic conduction structure is arranged at a receiving tool-driven connecting end of the extension rod.

19 Claims, 5 Drawing Sheets

(56) References Cited

U.S. PATENT DOCUMENTS

| | | | | |
|---|---|---|---|---|
| 3,707,894 | A * | 1/1973 | Stillwagon, Jr. | B25B 23/12<br>81/125 |
| 5,724,873 | A * | 3/1998 | Hillinger | B25B 23/12<br>81/125 |
| 6,060,801 | A * | 5/2000 | Anderson | B25B 23/12<br>81/451 |
| 6,278,349 | B1 * | 8/2001 | Giffin | B25B 23/12<br>335/284 |
| 12,094,652 | B2 * | 9/2024 | Lee | H01F 7/206 |
| 2009/0139378 | A1 * | 6/2009 | Chiang | B25B 23/12<br>81/438 |
| 2022/0328227 | A1 * | 10/2022 | Lee | B25B 23/12 |

* cited by examiner

HIGH-INTENSITY MAGNETIC TOOL EXTENSION ROD

CROSS-REFERENCE TO RELATED APPLICATION

This patent application is a national stage application of International Patent Application No. PCT/CN2023/083947, filed on Mar. 27, 2023, which claims the benefit and priority of Chinese Patent Application No. 202310128979.X, filed with the China National Intellectual Property Administration on Feb. 17, 2023, the disclosure of which is incorporated by reference herein in its entirety as part of the present application.

TECHNICAL FIELD

The present disclosure relates to the field of electric tool accessories, in particular to a high-intensity magnetic tool extension rod.

BACKGROUND

When an electric tool (usually referring to an electric drill) works, in order to improve the working efficiency, a certain nail strengthening function is usually necessary for a screw bit. In the prior art, a screw bit with magnetism is usually used to adsorb screws. When an extension rod is used, the magnetism carried by the screw bit mainly comes from a magnet arranged in the extension rod installed on the screw bit. The magnet magnetizes the screw bit through contact with a tail plane of the screw bit, thus achieving an effect of adsorbing screws. Therefore, it can be considered that the magnet located inside a sleeve transmits the magnetism to a screw connected with the screw bit through the screw bit, but the effect of the nail strengthening mode is not good. The main reasons are that the distance between the screw and the magnet is long, and the contact area between the tail plane of the screw bit and the magnet is limited, and the inner hole size of the extension rod limits the increase of the volume of the magnet to realize further improvement of magnetic force.

In order to improve the above phenomenon, the magnet and the sleeve for fixing the magnet are arranged outside an exposed part of the screw bit inserted in a hole of the extension rod, and the magnet can be in direct contact with and adsorb the screw, so that the adsorption capacity for screws can be increased by the magnet with a larger volume and a smaller distance from the screw. However, the mode has the disadvantage that the diameter of the connecting rod becomes very large, so that the a sight line of a user is affected. Under some working conditions, a tip of the screw bit is inconvenient to align with a tail connector of the screw when the screw needs to be disassembled. On the other hand, the magnet around the tip of the screw bit with larger diameter is not beneficial to assembling or disassembling screws in counter bores, and the magnet needs to be removed to change the diameter to complete the work.

SUMMARY

In order to solve shortages in the prior art, the present disclosure provides a high-intensity magnetic tool extension rod, and solves the technical problem that an electric tool screw bit is poor in adsorption capacity to screws.

In order to achieve the above target, the present disclosure adopts the following technical scheme.

Disclosed is a high-intensity magnetic tool extension rod. The high-intensity magnetic tool extension rod includes an extension rod, magnets and magnetic conduction structures. The magnets are symmetrically distributed on a lateral part of the extension rod with an axis center of the extension rod as a center. The magnetic conduction structures are arranged on an axial side of the magnet.

Preferably, according to the high-intensity magnetic tool extension rod, the magnetic conduction structures include a front magnetic conduction structure and a rear magnetic conduction structure which are respectively arranged on both sides of the magnet. The front magnetic conduction structure is arranged at an adapted tool head connecting end of the extension rod, and the rear magnetic conduction structure is arranged at a receiving tool-driven connecting end of the extension rod.

Preferably, according to the high-intensity magnetic tool extension rod, the magnet is annular and is in sleeve joint with the extension rod. The front magnetic conduction structure is a front magnetic conduction ring sleeve joint with a tool head connecting end of the extension rod, and the rear magnetic conduction structure is a rear magnetic conduction ring in sleeve joint with a tool-driven connecting end of the extension rod.

Preferably, according to the high-intensity magnetic tool extension rod, an axial length of the front magnetic conduction ring is larger than that of the magnet, and an axial length of rear magnetic conduction ring is larger than that of the magnet.

Preferably, according to the high-intensity magnetic tool extension rod, the magnet is a magnetic ring, and an inner hole of the magnetic ring is in contact with an outer surface of the extension rod.

Preferably, according to the high-intensity magnetic tool extension rod, the magnetic conduction structure is in multi-point contact or face contact with the outer surface of the extension rod.

Preferably, according to the high-intensity magnetic tool extension rod, inner walls of the front magnetic conduction ring and the rear magnetic conduction ring are both in contact with the outer surface of the extension rod.

Preferably, according to the high-intensity magnetic tool extension rod, a screw bit connecting hole is formed in extension rod. An in-rod magnet is also arranged at the bottom of the screw bit connecting hole. A magnetic pole direction of the in-rod magnet is the same as that of the magnetic ring.

Preferably, according to the high-intensity magnetic tool extension rod, an axial distance between the front magnetic conduction ring and the magnet is no more than 3 mm, and a non-magnetic conduction structure is arranged between the front magnetic conduction ring and magnet. An axial distance between the rear magnetic conduction ring and the magnet is no more than 3 mm, and a non-magnetic conduction structure is arranged between the rear magnetic conduction ring and the magnet.

Preferably, according to the high-intensity magnetic tool extension rod, the extension rod is made of a non-magnetic conduction material.

Preferably, according to the high-intensity magnetic tool extension rod, the magnetic conduction structure includes a smaller-diameter end and a larger-diameter end, and the larger diameter end is closer to the magnet relative to the smaller-diameter end.

Preferably, according to the high-intensity magnetic tool extension rod, a detachable structure is arranged between the smaller-diameter end and the larger-diameter end.

Preferably, according to the high-intensity magnetic tool extension rod, the smaller-diameter end is one or more combinations of a sleeve, a sleeve with an opening in the side, a spring, and a leaf spring.

The present disclosure has the following beneficial effects.

Compared with the prior art, magnetic lines are guided and collected to a tip of a screw bit through the magnetic conduction structures, and the magnetic field direction is improved, so that the tip of the screw bit is higher in magnetism, and the technical problem that the screw bit of an electric tool is poor in adsorption capacity to a screw in the prior art is solved. Because a nail is mainly adsorbed by a magnetic field, compared with an existing nail adsorption mode, the abrasion caused by direct contact of the magnet is avoided, the service life of the magnet is prolonged, and an operation field of the user is basically free from interference of the magnet.

In the prior art, when a nail with a smaller diameter is directly adsorbed by the magnetic ring, an inner hole of the magnetic ring is larger than an outer diameter of a screw head, so that the screw cannot be adsorbed, or the screw cannot be straightened because a contact surface with the magnetic ring is uneven or cannot be in contact because the screw head is semicircular. Due to the influence of the diameter of the screw bit, a diameter of the inner hole of the magnetic ring should not be less than 7.2 mm, so that the tip of the screw bit can be exposed to drive the screw. Therefore, this size of the inner hole of the magnetic ring is not suitable for the nail with a smaller diameter.

Compared with other high-intensity magnetic connecting rods, a plane of the screw is adsorbed without relying on an end face of the magnet, so screws of various shapes can be straightened. The device is convenient for one-hand operation. Because magnetic force mainly comes from magnetic field induction, a small-sized hexagonal shank sleeve also has magnetism after being provided with an upper connecting rod and can adsorb an outer hexagonal screw. The device is convenient for installation and disassembly.

When a longer screw bit needs to be replaced, the magnetism of a front end of the screw bit cannot be greatly weakened due to increase of a length of the screw bit. Magnetic force of a common connecting rod in the market is not large enough, and the screw can barely be adsorbed when a one-inch screw bit is used. However, if a two-inch screw bit is installed, the magnetic force at the tip of the screw bit is very weak and cannot adsorb screws due to increase of a distance from the magnetic ring. By adopting the connecting rod in the present disclosure, the magnetic force transmission efficiency is much higher than that of the common connecting rod due to a magnetic field induction mode. Even if a longer screw bit is installed, the magnetic force at the tip of the screw bit is several times higher than that of the common connecting rod, and it is still sufficient to straighten smaller screws, which is very helpful for assembling and disassembling screws in deeper holes, such as assembly of electrical appliances.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Reference signs: 1, extension rod; 2, magnet; 3, front magnetic conduction ring; 4, rear magnetic conduction ring; 5, receiving tool-driven connecting end; 6, in-rod magnet; 7, screw bit; 31, first larger-diameter end; 32, first smaller-diameter end; 41, second larger-diameter end; and 42, second smaller-diameter end.

DETAILED DESCRIPTION OF THE EMBODIMENTS

The present disclosure is further described below in combination with the attached figures. The following embodiment serves only to more clearly illustrate the technical solutions of the present disclosure, and therefore, as an example only and cannot limit the scope of protection of the present disclosure in this way.

Figure 1:
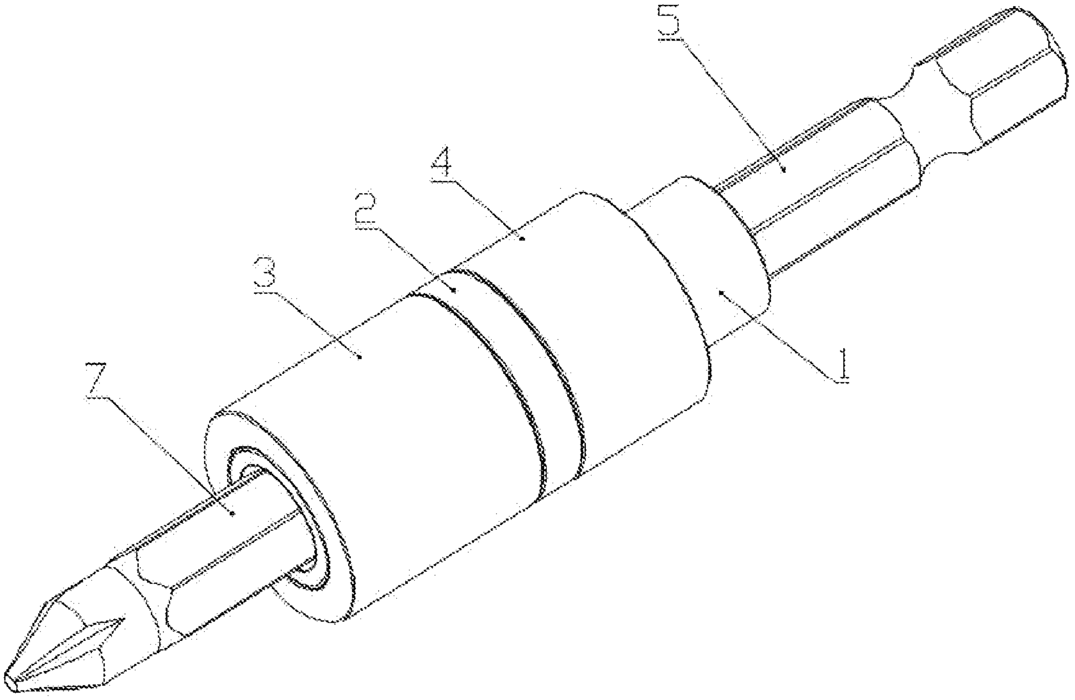
FIG. 1 is an overall structural diagram of the present disclosure.
Figure 2:
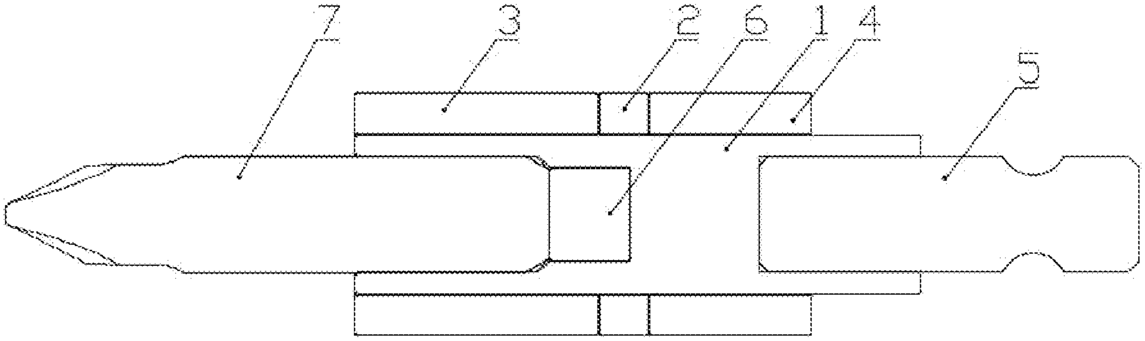
FIG. 2 an axial section view of a first embodiment in the present disclosure.

Embodiment I as shown in FIG. 1 and FIG. 2, the embodiment discloses a high-intensity magnetic tool extension rod. The high-intensity magnetic tool extension rod includes an extension rod 1, magnets 2 and magnetic conductive structures. The magnets 2 are symmetrically distributed on a lateral part of the extension rod 1 with an axis center of the extension rod 1 as a center. Usually, the magnet is annular, so the magnet can also be called a permanent magnet ring. The permanent magnet ring is in sleeve joint with the extension rod, and an inner hole of the permanent magnet ring is in contact with an outer surface of the extension rod 1.

The magnetic conduction structures include a front magnetic conduction structure and a rear magnetic conduction structure which are respectively arranged on both sides of the magnet. Preferably, the front magnetic conduction structure is a front magnetic conduction structure 3 in sleeve joint with a tool head connecting end of the extension rod, and the rear magnetic conduction structure is a rear magnetic conduction ring 4 in sleeve joint with a tool-driven connecting end of the extension rod. An axial distance between the front magnetic conduction ring 3 and the magnet 2 and an axial distance between the rear magnetic conduction ring 4 and the magnet 2 are no more than 3 mm, and a direct end contact manner is adopted usually.

The front magnetic conduction structure is arranged at a screw connecting end (screw bit mounting end) of the extension rod 1, and the rear magnetic conduction structure is arranged at a receiving tool-driven connecting end 5 (electric drill clamping end) of the extension rod 1.

An axial size (length) of the front magnetic conduction ring 3 is larger than that of the magnet 2, and an axial size of the rear magnetic conduction ring 4 is larger than that of the magnet 2. Inner walls of the front magnetic conduction ring 3 and the rear magnetic conduction ring 4 are both in contact with the outer surface of the extension rod 1.

A screw bit connecting hole is formed in the extension rod 1. An in-rod magnet 6 also arranged at the bottom of the screw bit connecting hole. A magnetic pole of the in-rod magnet 6 is the same as that of a magnetic ring.

Figure 5:
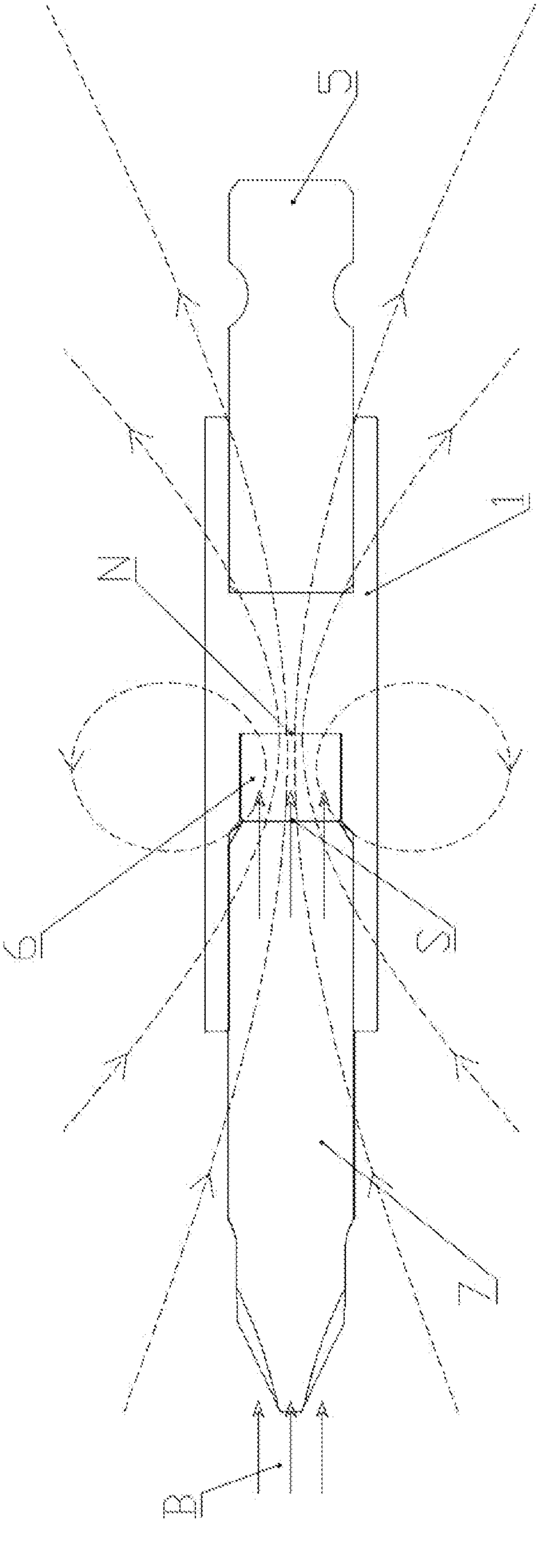
FIG. 5 is a distribution diagram of magnetic induction lines in the prior art.

As shown in FIG. 5, FIG. 5 shows a magnetic screw bit in the prior art. A screw is adsorbed to the screw bit by the action of the in-rod magnet 6. Dotted lines in FIG. 5 indicates magnetic lines. Since the magnetic lines is a closed curve, magnetic induction lines can be distributed as far as possible along the interior of the screw bit 7 to a certain extent. However, the adsorption effect is poor in actual use because the in-rod magnet 6 is far away from the screw.

Figure 3:
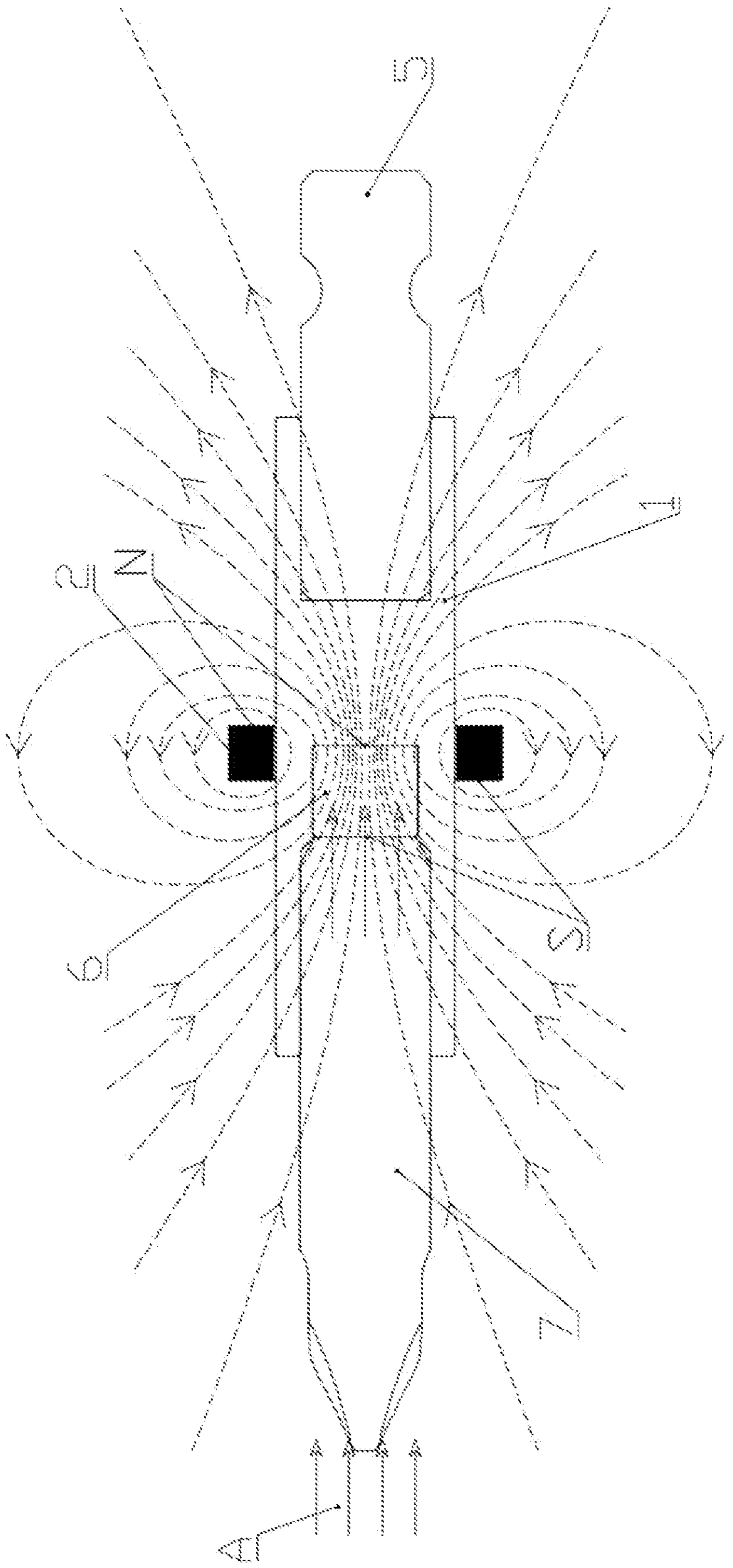
FIG. 3 is a distribution diagram of magnetic induction lines without adding a magnetic conduction ring in the present disclosure.

As shown in FIG. 3, the magnet 2 should not be too close to the screw bit 7 in order to ensure a visual field at an end of the screw bit 7. Therefore, in despite of dual actions of the magnet 2 and the in-rod magnet 6, magnetism of the screw bit is only slightly higher than that in FIG. 5 due to the characteristics of the magnetic lines.

Figure 4:
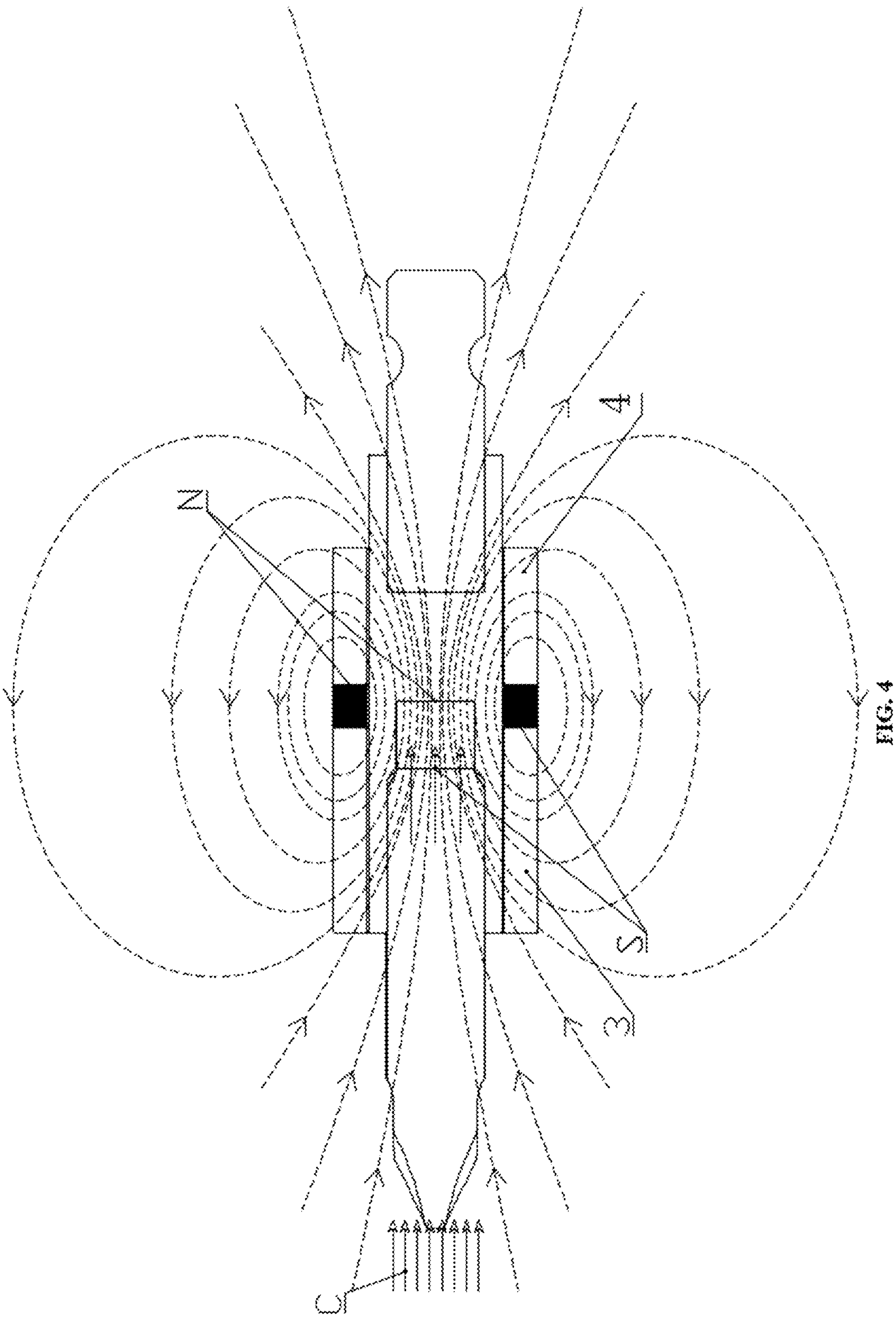
FIG. 4 is a distribution diagram of magnetic induction lines with added magnetic conduction rings in the present disclosure.

As shown in FIG. 4, compared with FIG. 3, the front magnetic conduction ring 3 and the rear magnetic conduction ring 4 are added in FIG. 4. Because a magnetic conduction effect of the magnetic ring is much greater than that of air (compared with FIG. 3), the front magnetic conduction ring 3 and the rear magnetic conduction ring 4 can lengthen the closed magnetic lines along the direction of the extension rod 1, so that the magnetic lines passing through the screw bit are denser, so the adsorption effect on the screw is higher.

Because magnetism of the magnet is not increased with the increase of the volume of the magnet, that is to say, even if the length of the magnet 2 is very long, magnetism at an end of the magnet is not increased with the increase of the length of the magnet 2. Through experiments, after an axial length of the magnet 2 is increased to 5 mm, the length of the magnet 2 continues to be increased, but the increase of the magnetism at the end is very little. Therefore, even if the front magnetic conduction ring 3, the rear magnetic conduction ring 4 and the magnet 2 are replaced with magnetic rings of equal length, the effect is not as good as that in FIG. 4. The magnetic lines are gathered at ends of the screw bit by the magnetic rings, so that the adsorption capacity of the screw bit for the screw can be greatly increased.

On the other hand, a thickness of the magnet 2 is also related to a thickness of the in-rod magnet 6. Because of a magnetic pole problem, if the thickness of the magnet 2 is too large, a magnetic pole surface of the in-rod magnet 6 is in the range of an opposite magnetic pole surface of an outer magnetic ring (magnet 2), and then magnetic fluxes of the two magnets may cancel each other. On the contrary, magnetic force at the tip of the screw bit is lower.

If a length of the screw bit 7 is regarded as a part of a magnetic conduction body, according to a principle of symmetrical distribution of magnetic fields and a principle of non-overlapping and uncrossed magnetic lines, more magnetic lines can be closed better due to a length of the rear magnetic conduction ring 4. The magnetic lines can be collected more densely at the tip of the screw bit, and then the magnetism of the tip of the screw bit is increased.

Embodiment II

Figure 6:
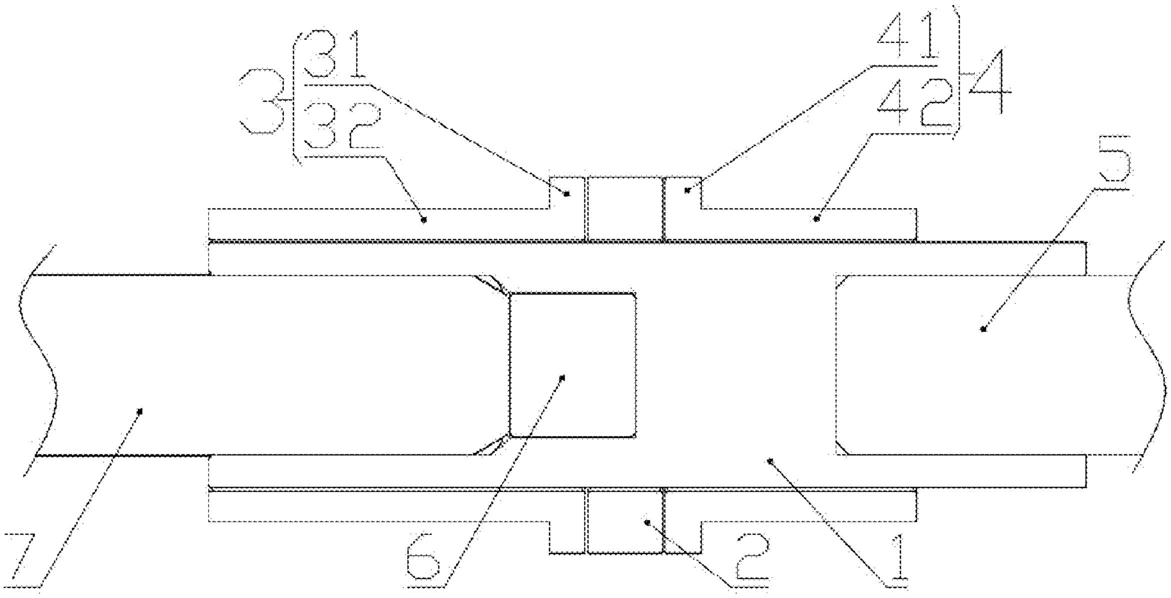
FIG. 6 an axial section view of a second embodiment in the present disclosure.

As shown in FIG. 6, relative to the first embodiment, the magnetic conduction structure of the embodiment is changed, and the magnetic conduction structure is divided into a larger-diameter end and a smaller-diameter end. Specifically, the front magnetic conduction ring 3 includes a first larger-diameter end 31 and a first smaller-diameter end 32, and the magnetic conduction ring 4 includes a second larger-diameter end 41 and a second smaller-diameter end 42. The first larger-diameter end 31 and the second smaller-diameter end 42 are located at an end close to the magnet 2. In practical applications, the smaller-diameter end and the larger-diameter end may be of a detachable structure. For example, the larger-diameter end may be a flat gasket in the prior art, and the smaller-diameter end may be one or more combinations of a sleeve, a sleeve with an opening in the side, a leaf spring, and a spring. The present disclosure has the following advantages. Firstly, the product cost can be saved. Secondly, the ends of the screw bit are more convenient for a user to observe through the smaller-diameter end.

Compared with the prior art, magnetic lines are guided and collected to a tip of a screw bit through the magnetic conduction structures, and the magnetic field direction is improved, so that the tip of the screw bit is higher in magnetism, and the technical problem that an electric tool screw bit is poor in adsorption capacity to screws in the prior art is solved. Because a nail is mainly adsorbed by a magnetic field, compared with an existing nail adsorption mode, the abrasion caused by direct contact of the magnet is avoided, the service life of the magnet is prolonged, and an operation field of the user is basically free from interference of the magnet. Similarly, in the prior art, when a nail with a smaller diameter is directly adsorbed by the magnetic ring, an inner hole of the magnetic ring is larger than an outer diameter of a screw head, so that the screw cannot be adsorbed, or the screw cannot be straightened because a contact surface with the magnetic ring is uneven or cannot be in contact because the screw head is semicircular. Due to the influence of the diameter of the screw bit, a diameter of the inner hole of the magnetic ring should not be less than 7.2 mm, so that the tip of the screw bit can be exposed to drive the screw. Therefore, this size of the inner hole of the magnetic ring is not suitable for the nail with a smaller diameter.

Compared with other high-intensity magnetic connecting rods, a plane of the screw is adsorbed without relying on an end face of the magnet, so screws of various shapes can be straightened. The device is convenient for one-hand operation. Because the magnetic force mainly comes from magnetic field induction, a small-sized hexagonal shank sleeve also has magnetism after being provided with an upper connecting rod and can adsorb an outer hexagonal screw. The device is convenient for installation and disassembly.

When a longer screw bit 7 needs to be replaced, the magnetism of a front end of the screw bit 7 cannot be greatly weakened due to increase of a length of the screw bit 7. Magnetic force of a common connecting rod in the market is not large enough, and the screw can barely be adsorbed when a one-inch screw bit is used. However, if a two-inch screw bit is installed, the magnetic force at the tip of the screw bit is very weak and cannot adsorb screws due to increase of a distance from the magnetic ring. By adopting the connecting rod in the present disclosure, the magnetic force transmission efficiency is much higher than that of the common connecting rod due to a magnetic field induction mode. Even if a longer screw bit is installed, the magnetic force at the tip of the screw bit is several times higher than that of the common connecting rod, and it is still sufficient to straighten smaller screws, which is very helpful for assembling and disassembling screws in deeper holes, such as assembly of electrical appliances.

The foregoing descriptions are merely example implementations of the present disclosure. It should be noted that those skilled in the art may make several improvements or deformations without departing from the principle of the present disclosure and the improvements or deformations shall fall within the protection scope of the present disclosure.

What is claimed is:

1. A high-intensity magnetic tool extension rod, comprising an extension rod (1), a magnet (2) and magnetic conduction structures, wherein the magnet (2) is arranged around an outer side of the extension rod (1) with an axis center of the extension rod (1) as a center, and the magnetic conduction structures are arranged on an axial side of the magnet (2);

wherein the magnetic conduction structures comprise a front magnetic conduction structure and a rear magnetic conduction structure which are respectively arranged on both sides of the magnet (2), the front magnetic conduction structure is arranged at an adapted tool head connecting end of the extension rod (1), and the rear magnetic conduction structure is arranged at a receiving tool-driven connecting end (5) of the extension rod (1).

2. The high-intensity magnetic tool extension rod according to claim 1, wherein the magnet (2) is annular and is in sleeve joint with the extension rod (1), the front magnetic conduction structure is a front magnetic conduction ring (3) in sleeve joint with a tool head connecting end of the extension rod (1), and the rear magnetic conduction structure is a rear magnetic conduction ring (4) in sleeve joint with a tool-driven connecting end of the extension rod (1).

3. The high-intensity magnetic tool extension rod according to claim 1, wherein an axial length of the front magnetic conduction ring (3) is larger than that of the magnet (2), and an axial length of the rear magnetic conduction ring (4) is larger than that of the magnet (2).

4. The high-intensity magnetic tool extension rod according to claim 3, wherein the magnet (2) is a magnetic ring, and an inner hole of the magnetic ring is in contact with an outer surface of the extension rod (1).

5. The high-intensity magnetic tool extension rod according to claim 3, wherein inner walls of the front magnetic conduction ring (3) and the rear magnetic conduction ring (4) are both in contact with the outer surface of the extension rod (1).

6. The high-intensity magnetic tool extension rod according to claim 2, wherein the magnet (2) is a magnetic ring, and an inner hole of the magnetic ring is in contact with an outer surface of the extension rod (1).

7. The high-intensity magnetic tool extension rod according to claim 2, wherein inner walls of the front magnetic conduction ring (3) and the rear magnetic conduction ring (4) are both in contact with the outer surface of the extension rod (1).

8. The high-intensity magnetic tool extension rod according to claim 2, wherein a screw bit connecting hole is formed in the extension rod (1), an in-rod magnet (6) is also arranged at the bottom of the screw bit connecting hole, and a magnetic pole direction of the in-rod magnet (6) is the same as that of the magnetic ring.

9. The high-intensity magnetic tool extension rod according to claim 2, wherein an axial distance between the front magnetic conduction ring (3) and the magnet (2) is no more than 3 mm, and a non-magnetic conduction structure is arranged between the front magnetic conduction ring (3) and the magnet (2); and an axial distance between the rear magnetic conduction ring (4) and the magnet (2) is no more than 3 mm, and a non-magnetic conduction structure is arranged between the rear magnetic conduction ring (4) and the magnet (2).

10. The high-intensity magnetic tool extension rod according to claim 2, wherein the extension rod (1) is made of a non-magnetic conduction material.

11. The high-intensity magnetic tool extension rod according to claim 1, wherein an axial length of the front magnetic conduction ring (3) is larger than that of the magnet (2), and an axial length of the rear magnetic conduction ring (4) is larger than that of the magnet (2).

12. The high-intensity magnetic tool extension rod according to claim 1, wherein the magnet (2) is a magnetic ring, and an inner hole of the magnetic ring is in contact with an outer surface of the extension rod (1).

13. The high-intensity magnetic tool extension rod according to claim 1, wherein the magnetic conduction structure is in multi-point contact or face contact with the outer surface of the extension rod (1).

14. The high-intensity magnetic tool extension rod according to claim 1, wherein a screw bit connecting hole is formed in the extension rod (1), an in-rod magnet (6) is also arranged at the bottom of the screw bit connecting hole, and a magnetic pole direction of the in-rod magnet (6) is the same as that of the magnetic ring.

15. The high-intensity magnetic tool extension rod according to claim 1, wherein the extension rod (1) is made of a non-magnetic conduction material.

16. The high-intensity magnetic tool extension rod according to claim 1, wherein the extension rod (1) is made of a non-magnetic conduction material.

17. The high-intensity magnetic tool extension rod according to claim 1, wherein the magnetic conduction structure comprises a smaller-diameter end and a larger-diameter end, and the larger-diameter end is closer to the magnet relative to the smaller-diameter end.

18. The high-intensity magnetic tool extension rod according to claim 17, wherein a detachable structure is arranged between the smaller-diameter end and the larger-diameter end.

19. The high-intensity magnetic tool extension rod according to claim 17, wherein the smaller-diameter end is one or more combinations of a sleeve, a sleeve with an opening in the side, a spring, and a leaf spring.

* * * * *